United States Patent
Rahamat et al.

(10) Patent No.: US 11,518,541 B2
(45) Date of Patent: Dec. 6, 2022

(54) COMPOSITE PANEL COMPRISING A PERFORATED METALLIC FOIL FOR LIGHTNING STRIKE PROTECTION AND A PERFORATED METALLIC FOIL

(71) Applicant: Airbus SAS, Blagnac (FR)

(72) Inventors: Mohammed Salim Rahamat, Wallingford, CT (US); Mark A. Murdoch, Wallingford, CT (US); Kenneth William Burtt, Wallingford, CT (US); Brett Alexander Macdonald, Wallingford, CT (US); Franck Flourens, Blagnac (FR); Richard Murillo, Blagnac (FR); Valentin Garcia Martinez, Blagnac (FR); Pablo Perez Cabrero, Blagnac (FR)

(73) Assignee: AIRBUS SAS, Blagnac (FR)

( * ) Notice: Subject to any disclaimer, the term of this patent is extended or adjusted under 35 U.S.C. 154(b) by 101 days.

(21) Appl. No.: 17/053,333

(22) PCT Filed: Apr. 16, 2019

(86) PCT No.: PCT/EP2019/059744
§ 371 (c)(1),
(2) Date: Nov. 5, 2020

(87) PCT Pub. No.: WO2019/214910
PCT Pub. Date: Nov. 14, 2019

(65) Prior Publication Data
US 2021/0122492 A1    Apr. 29, 2021

Related U.S. Application Data

(63) Continuation of application No. 15/973,905, filed on May 8, 2018, now Pat. No. 10,351,259.

(30) Foreign Application Priority Data

May 30, 2018 (EP) .................................... 18382370

(51) Int. Cl.
*B32B 15/04* (2006.01)
*B32B 15/20* (2006.01)
(Continued)

(52) U.S. Cl.
CPC ............ *B64D 45/02* (2013.01); *B23K 26/082* (2015.10); *B23K 26/38* (2013.01); *B23K 26/384* (2015.10);
(Continued)

(58) Field of Classification Search
None
See application file for complete search history.

(56) References Cited

U.S. PATENT DOCUMENTS 3,989,984 A * 11/1976 Amason ................ B29C 70/885
361/212
5,352,565 A   10/1994 Schroeder
(Continued)

FOREIGN PATENT DOCUMENTS

EP        0522663 A1    1/1993
JP        2015156939 A  9/2015

OTHER PUBLICATIONS

International Search Report; priority document.
(Continued)

*Primary Examiner* — Xiaobei Wang
(74) *Attorney, Agent, or Firm* — Greer, Burns & Crain, Ltd.

(57) ABSTRACT

A composite panel having a plurality of carbon plies, a perforated metallic foil comprising several apertures and being directly secured to the plurality of carbon plies, and a
(Continued)

protective layer made from resin reinforced with fibers which is secured to the metallic foil. The perforated metallic foil is embedded in the protective layer through its apertures. A free surface of the protective layer forms a top side of the composite panel. The thickness of the protective layer between the top side of the composite panel and the perforated metallic foil is at least 15 micrometers and the perforated metallic foil has a thickness of not more than 30 micrometers. The plurality of apertures in the aggregate defines an open area of not more than 40% of the surface area and a maximum distance between two opposed points in a perimeter of an aperture is equal to or less than 3 mm.

6 Claims, 8 Drawing Sheets

(51) Int. Cl.
| | |
|---|---|
| B32B 15/08 | (2006.01) |
| B32B 3/12 | (2006.01) |
| B32B 3/20 | (2006.01) |
| B32B 7/025 | (2019.01) |
| B32B 3/26 | (2006.01) |
| B32B 15/14 | (2006.01) |
| B64D 45/02 | (2006.01) |
| B23K 26/38 | (2014.01) |
| B26F 1/02 | (2006.01) |
| C23C 28/04 | (2006.01) |
| C23C 30/00 | (2006.01) |
| C23C 28/00 | (2006.01) |
| B23K 26/40 | (2014.01) |
| B23K 26/082 | (2014.01) |
| B23K 26/384 | (2014.01) |
| B23K 101/00 | (2006.01) |
| B23K 101/18 | (2006.01) |
| B23K 103/10 | (2006.01) |

(52) U.S. Cl.
CPC .............. *B23K 26/40* (2013.01); *B26F 1/02* (2013.01); *B32B 3/12* (2013.01); *B32B 3/20* (2013.01); *B32B 3/266* (2013.01); *B32B 7/025* (2019.01); *B32B 15/04* (2013.01); *B32B 15/08* (2013.01); *B32B 15/14* (2013.01); *B32B 15/20* (2013.01); *C23C 28/04* (2013.01); *C23C 28/046* (2013.01); *C23C 28/34* (2013.01); *C23C 28/345* (2013.01); *C23C 30/00* (2013.01); *C23C 30/005* (2013.01); *B23K 2101/006* (2018.08); *B23K 2101/18* (2018.08); *B23K 2103/10* (2018.08); *C23C 2222/20* (2013.01); *Y10T 428/1266* (2015.01); *Y10T 428/1291* (2015.01); *Y10T 428/12361* (2015.01); *Y10T 428/12368* (2015.01); *Y10T 428/12431* (2015.01); *Y10T 428/12438* (2015.01); *Y10T 428/12569* (2015.01); *Y10T 428/12611* (2015.01); *Y10T 428/12618* (2015.01); *Y10T 428/12667* (2015.01); *Y10T 428/12736* (2015.01); *Y10T 428/12882* (2015.01); *Y10T 428/12903* (2015.01); *Y10T 428/24273* (2015.01); *Y10T 428/24281* (2015.01); *Y10T 428/24289* (2015.01); *Y10T 428/24298* (2015.01); *Y10T 428/24306* (2015.01); *Y10T 428/24314* (2015.01); *Y10T 428/24322* (2015.01); *Y10T 428/24388* (2015.01); *Y10T 428/24413* (2015.01)

(56) References Cited

U.S. PATENT DOCUMENTS

| | | | |
|---|---|---|---|
| 5,370,921 A * | 12/1994 | Cedarleaf | ............... B32B 15/14 |
| | | | 428/138 |
| 5,806,796 A | 9/1998 | Healey | |
| 10,604,272 B2 | 3/2020 | Rahamat et al. | |
| 2006/0051592 A1 | 3/2006 | Rawlings et al. | |
| 2009/0274924 A1 | 11/2009 | Pelzer et al. | |
| 2010/0147546 A1 | 6/2010 | Mull et al. | |
| 2010/0263898 A1 | 10/2010 | Herbert | |
| 2012/0003495 A1 | 1/2012 | Cavaliere et al. | |
| 2012/0219817 A1 | 8/2012 | Konishi et al. | |
| 2012/0271564 A1 | 10/2012 | Dudley et al. | |
| 2013/0271891 A1* | 10/2013 | Shimp | ..................... H02H 1/04 |
| | | | 361/220 |
| 2015/0087782 A1 | 3/2015 | Hoshino | |
| 2016/0046385 A1 | 2/2016 | Brown | |

OTHER PUBLICATIONS

European Search Report; priority document.
Dexmet Corporation's "End Item" description sheet of the 175 gsm product (142 micron thick).

\* cited by examiner

COMPOSITE PANEL COMPRISING A PERFORATED METALLIC FOIL FOR LIGHTNING STRIKE PROTECTION AND A PERFORATED METALLIC FOIL

CROSS-REFERENCES TO RELATED APPLICATIONS

This application claims the benefit of the International Application No. PCT/EP2019/059744, filed on Apr. 16, 2019, and of the European patent application No. 18382370.7 filed on May 30, 2018, and of the U.S. patent application Ser. No. 15/973,905 filed on May 8, 2018, the entire disclosures of which are incorporated herein by way of reference.

FIELD OF THE INVENTION

This invention relates to a composite panel comprising a perforated metallic foil for lightning strike protection of an aerospace structure, and a perforated metallic foil.

BACKGROUND OF THE INVENTION

Aluminum has been the principal material used in aircraft and aerospace construction for the past 60 years. With the growing interest to construct more efficient aircraft, manufacturers are designing more components out of light-weight composite materials. In particular, current composite panels form the skin of the fuselage, and of the wings. Composites, however, are poor conductors of electrical current. It is known that without proper protection, composite materials are susceptible to severe damage in the event of a lightning strike. To date, aircraft manufacturers have used aluminum or copper expanded foils or woven wire mesh incorporated into these composite panels to dissipate lightning strike energy and prevent damage to the composite panel.

Of the two approaches, expanded metallic foils have become the industry standard and are superior to woven wire as they do not unravel or have loose strands that may become problematic during processing into a pre-preg-material or when conducting a dry lay-up as part of the composite manufacturing process. The homogenous design of expanded metallic foils also ensures uncompromised conductivity even when forming the material into a variety of shapes and contours and it provides a smooth surface on the end product. Expanded metallic foils used in this application must be manufactured with tight tolerances to meet a specific weight, open area, and conductivity requirements.

Aircraft manufactures use design guidelines, such as those set forth by SAE International in its Aerospace Recommended Practice (ARP) 5414, which defines lightning strike zones (areas of the aircraft more susceptible to lightning strikes (e.g., Zone 1A, 1B). It also provides required electrical withstand capabilities for such strike zones. For example, often materials are required to have the ability to withstand a Zone 1A strike of 200,000 amps. For expanded foils, due to the limitations of the expansion process, the thinnest material possible to meet this criteria to date has been produced using 42 micrometer foils. The weight of this material is 175 grams per square meter, the resistivity is 3.6 milliohms per square, and the foil has 56% open area. A way to characterize the performance of foils in this application is to assess the foil's weight to conductivity ratio, with conductivity being the inverse of resistivity and represented in gram-ohms (gr-ohms) per square. For the above expanded foil, its weight to conductivity ratio is 0.63 gr-ohms.

Aircraft manufacturers are always looking for ways to increase efficiency, reduce costs, improve fuel economy, and reduce the amount of $CO_2$ emissions. One clear way to achieve these objectives is to reduce aircraft weight. By reducing the weight of the composite panels, the overall weight of the aircraft may be reduced; however, the conductivity criteria required for specific strike zones per SAE ARP54 1 4 must still be satisfied.

SUMMARY OF THE INVENTION

Thus, it would be desirable to produce lighter composite panels, which still meet the required electrical withstand capabilities and are resistant to erosion. The invention aims to meet all or part of this need. To this end, the invention is directed to a composite panel for aerospace structure as claimed in claim 1.

BRIEF DESCRIPTION OF THE DRAWINGS

Embodiments of the present invention will now be described, by way of example only, with reference to the attached Figures, wherein.

DETAILED DESCRIPTION OF THE PREFERRED EMBODIMENTS

Figure 1:
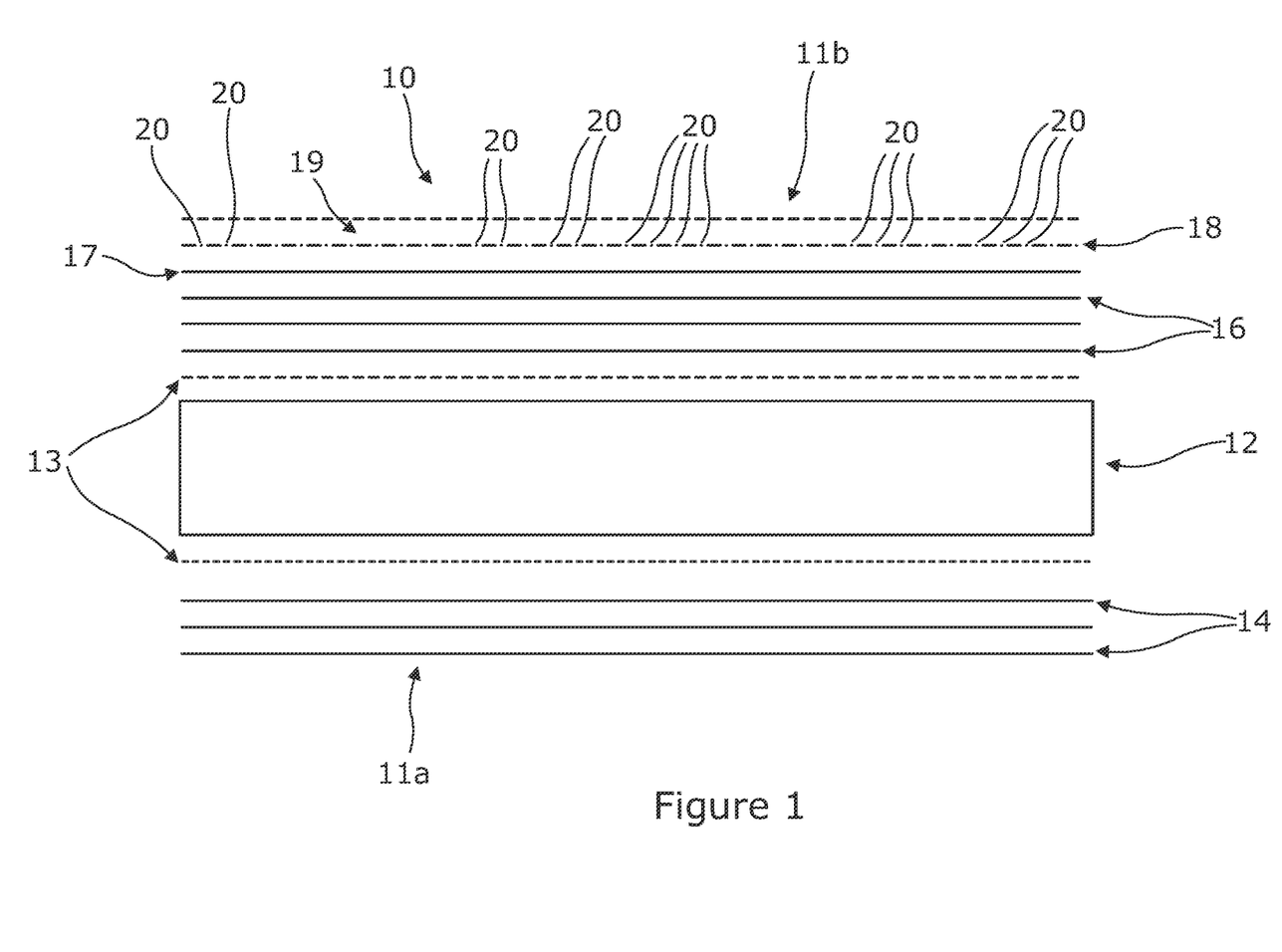
FIG. 1 is a cross sectional view of a composite panel including a perforated metallic foil according to an aspect of this invention.

In relation with the FIG. 1, a composite panel 10 which is, for example, used to construct the skin of the fuselage of an aircraft, comprises a honeycomb core 12 sandwiched between a first plurality of carbon plies 14 and a second plurality of carbon plies 16. Each one of the first and second plurality of carbon plies 14, 16 is affixed to the honeycomb core 12 using a bonding adhesive 13, such as, for example, epoxy resin. The first plurality of carbon plies 14 is arranged on a back side 11a of the panel 10 which is the side of the composite panel 10 that is cured against a vacuum bag used during the manufacturing of the panel 10.

According to the invention, the composite panel 10 comprises:

a thin perforated metallic foil 18 which has several apertures 20 and is secured to a plurality of carbon plies, here the second plurality of carbon plies 16 on the example of FIG. 1, directly or indirectly via an optional isolation ply 17 made of electrical insulating material, interposed between the perforated metallic foil 18 and the plurality of carbon plies; and a protective layer 19 made from resin (e.g., an epoxy-based resin) secured to the perforated metallic foil 18, with the perforated metallic foil 18 being embedded in the protective layer 19 through its apertures 20. A free surface of the protective layer 19 forms the top side 11b of the composite panel 10, i.e., the side of the panel 10 that when arranged on the structure of an aircraft, will form the exterior face of the skin of the aircraft and, as such, will be paint with protective and decorative paints.

One particular aim of the protective layer 19 is to prevent peeling of the perforated metallic foil 18. To this end, the thickness of the protective layer between the top side 11b of the composite panel 10 and the metallic foil 18 is at least 15 micrometers, and preferably around 40 micrometers. In particular, the protective layer 19 can contain a fibrous reinforcement to enhance its mechanical resistance and hence, to even reduce the tendency to peel away due to erosion causes by air flow mixed with dust and water droplets. This reinforcement, woven or non-woven, can be in glass fibers or in carbon fibers and its typical areal weight is comprised between 2 to 20 g/m².

During the manufacturing process of the composite panel 10, the protective layer 19 can be applied separately from the perforated metallic foil 18 (as a resin film) or it can also pre-impregnate the perforated metallic foil 18, or it could also come from resin injected or infused during the manufacturing process of the composite panel 10.

In any case, the areal weight of the surfacing film 19 is comprised between 20 and 200 g/m².

The perforated metallic foil 18 is designed to have a very low weight to conductivity ratio and with these characteristics the perforated metallic foil 18 is used to protect an aircraft whose external skin is formed by a composite panel 10 according to the invention from lightning strikes of a significant magnitude (e.g., Zone 1A strikes of 200,000 amps or more), while allowing the aircraft manufacturer to produce a lighter weight and more efficient aircraft.

Figure 2:
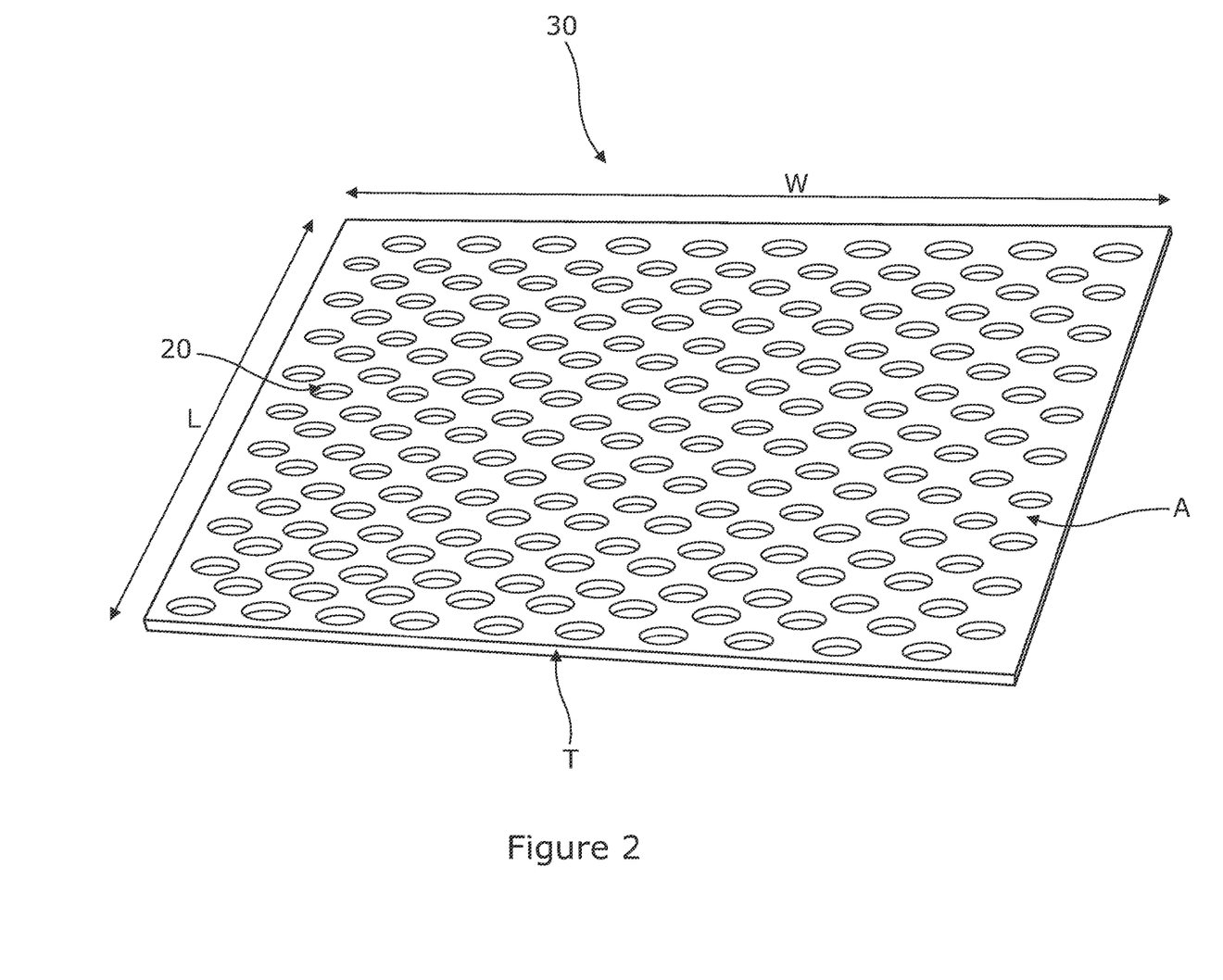
FIG. 2 is a perspective view of a portion of a perforated metallic foil for a composite panel as illustrated in FIG. 1.

Referring to FIG. 2, a perspective view of a portion 30 of perforated metallic foil 18 having circular-shaped apertures 20 is shown. Portion 30 of the perforated metallic foil 18 is shown to have a length, L, and a width, W, which define a surface area, A, of L*W. Distributed across surface area A are a plurality of apertures 20, which extend through the thickness, T, of the perforated metallic foil 18.

Figure 3:
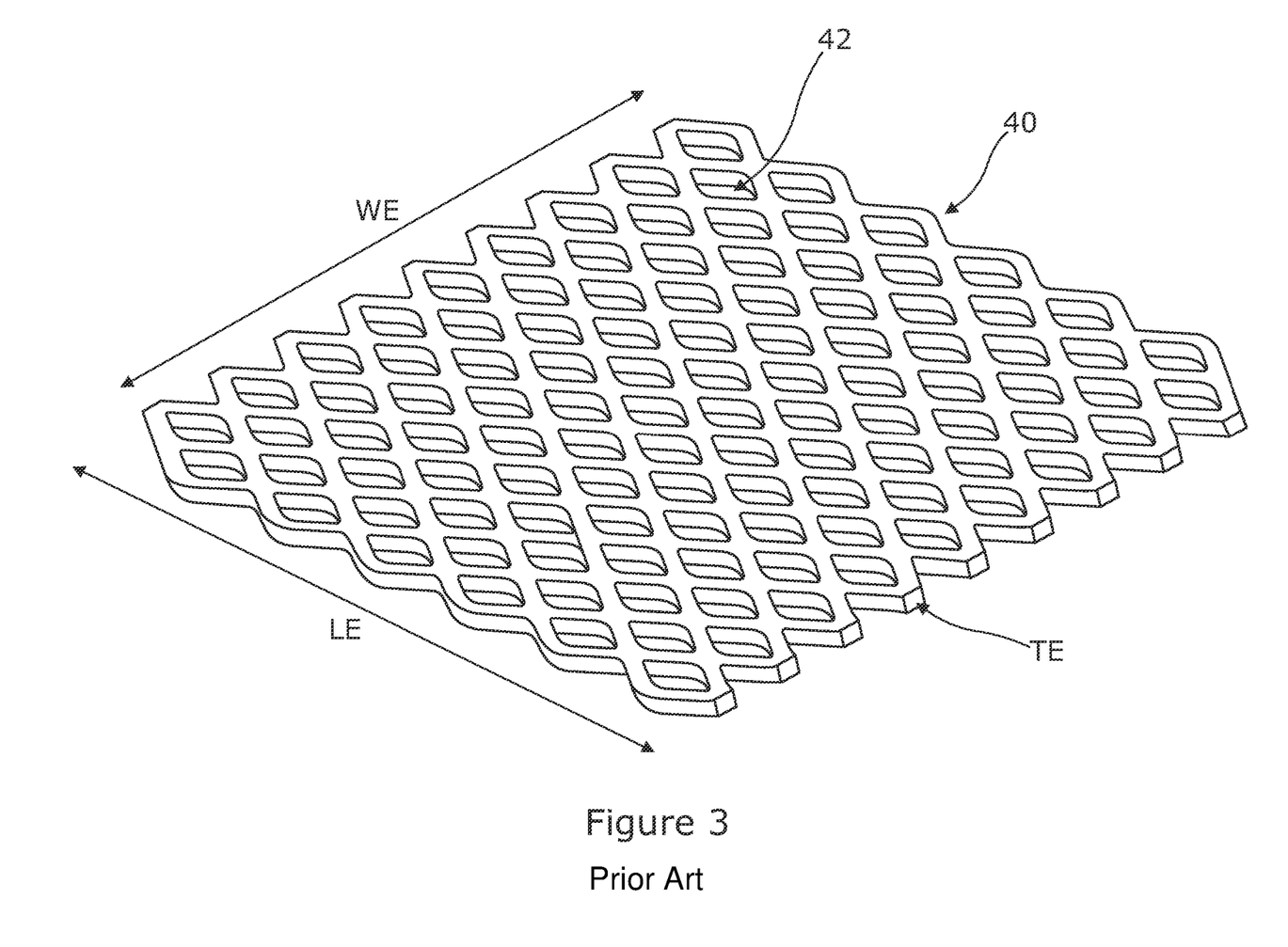
FIG. 3 is a perspective view of a portion of a prior art expanded foil.

The thickness T is no more than 30 micrometers in order to limit the weight of composite panel 10. For comparison, and in relation with FIG. 3, the thinnest achievable thickness TE of a portion 40 of an expanded material currently manufactured is approximately 40 micrometers. Expanded material is produced by slitting and stretching simultaneously a material. After such a process, the material will present a plurality of pores/openings 42, which in FIG. 3 are diamond-shaped. Due to the limitations of the expansion process, this is the thinnest material achievable while still meeting the low resistivity/high conductivity and strength requirements.

Thinner metallic perforated foils 18 are achievable; however, the aperature's size and spacing, as well as the amount of open area relative to total foil area must be optimized to achieve desired weight, strength, adhesion capability, and conductivity. Portion 30 of perforated metallic foil 18 in this example has uniformly spaced elliptical-shaped apertures, which may be formed in the foil by mechanically punching the material or using a laser to cut or ablate the material to form the pores. It is apparent from FIGS. 2 and 3 that the expanded metallic material portion 40 has a greater amount of open area (defined by aggregate area of pores 42) relative to total area, AE (LE*WE), than does portion 30 of perforated metallic foil, which has less open area (defined by aggregate area of pores 32) relative to total area, A. Limiting the open area allows the perforated metallic foil 18 to be made much thinner while still achieving the required strength and resistivity characteristics.

The open area of the perforated metallic foil 18 generally needs to be equal or below 40% of the overall surface area of the perforated metallic foil 18 in order to obtain a good compromise between weight and electrical performance.

The perforated metallic foil 18 is also configured to provide optimal adhesive qualities so that it can be layered into and effectively embedded in resin layers such as the protective layer 19. For purposes of our description, good adhesion of the perforated metallic foil 18 to a composite panel 10 after a curing cycle is one that prevents substantial peeling (e.g., less than 25%) of the perforated metallic foil 18 upon application of a high water jet with the following parameters: pressure, duration, distance, sweeping angle, sweeping frequency, water temperature, maximum peeled surface. The values for these parameters may be defined based on the requirements of the particular application.

It is desired to maximize the open area to allow the perforated metallic foil 18 to be stretched and hence to be applied on surfaces having double curvatures as could be the composite panel 10 to form an aircraft skin. The size and shape of the apertures 20 can vary as it will be explained below. However, when the perforated metallic foil 18 of a composite panel 10 is submitted to a peeling force, the shearing of the surfacing film thickness occurs on top of the aperture 20 edges. Thus, to reduce the shearing constraint encountered by the protective layer 19 and hence to increase the tolerance to peeling, it is advantageous to maximize the sum of the perimeters of all the apertures 20 per surface unit. For a given aperture rate, this is obtained by reducing both the aperture size and their pitch. Hence, the aperture size of the apertures 20 of the perforated metallic foil 18 is defined such that the maximum distance between two opposed points in the perimeter of an aperture 20 is comprised between 0.25 millimeters and 3 millimeters.

The limiting factor regarding how small the apertures 20 can be made belongs to the perforation process and to its associated speed.

In case perforations are made by mechanical puncturing/perforation (e.g., die-based perforation), the capability to manufacture small punches and the capability of the puncturing machine will limit the minimum size of the apertures 20. It has been found that apertures 20 having a dimension of 1 mm was close to the realistic limit.

In case perforations are made by laser etching, apertures 20 can be made smaller, i.e., between 0.25 mm and 1 mm.

Taking into account the ability of the perforated metallic foil 18 to be stretched, the peeling tolerance, and the constraint coming from perforation process, a pattern achieved with apertures 20 having a diameter dimension around 1 mm and an open area around 30% has been found to be convenient.

The typical types of metallic material which may be used for the perforated foil are copper, aluminum, and alloys thereof.

For a copper or copper alloy perforated foil 18, the plurality of apertures 20, in the aggregate, define an open area of not more than 40% of the surface area. The weight of the perforated copper foil 18 is not more than 300 g/m2, preferably 115 g/m2. Such a foil 18 of 115 g/m2 has a resistance of not more than 3.5 milliohms per square. This yields a weight to conductivity ratio of 0.40 gr-ohms. Compared with the 40 micrometers thick expanded copper foil described above, which has a 0.63 gr-ohms weight to conductivity ratio, this is more than a 35% improvement. With the perforated metallic foil 18 and processing used herein, it is expected that copper or copper alloy foils 18 as thin as approximately 12 micrometers would be achievable with comparable weight to conductivity ratios.

For an aluminum or aluminum alloy perforated foil 18 herein, the plurality of apertures 20, in the aggregate, define an open area of not more than 40% of the surface area. The weight of the perforated aluminum foil 18 may be not more than 250 g/m2. The perforated foil 18 may have a resistance of not more than 5.5 milliohms per square. This yields a weight to conductivity ratio of 0.19 gr-ohms. Compared with the 0.63 gr-ohms of the expanded copper foil, this is more than a 70% improvement in the weight to conductivity ratio. With the perforated metallic foil 18 and processing used herein, it is expected that aluminum or aluminum alloy foils as thin as approximately 12 micrometers would also be achievable with comparable weight to conductivity ratios.

Historically, lightning strike applications have primarily utilized either a woven material, which yields a square pattern, or expanded material, which yields diamond or hexagonal shapes. By using perforated apertures, and in relation with FIGS. 4 to 8, the open area in a perforated metallic foil 18 may be formed with apertures of different shapes, sizes, spacing and patterns.

The most efficient shapes, in terms of electric field lines, are rounded, as sharp corners that are necessarily prevalent in woven or expanded materials create higher flux density in the areas of the sharp corners. These higher flux areas naturally increase the measured resistivity of the material.

Figure 4:
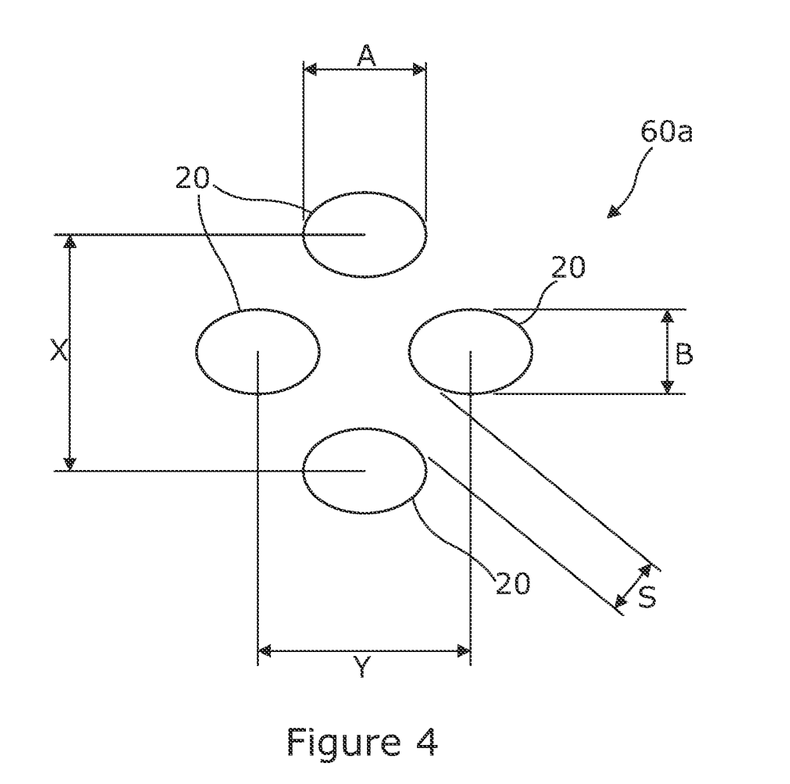
FIG. 4 is a plan view of a portion of the perforated metallic foil of the FIG. 2 having elliptical-shaped apertures.

Referring to FIG. 4, a portion 60a of a perforated metallic foil 18 is shown to include equally sized, elliptically shaped apertures 20. The apertures 20 may be sized as required for a particular application as long as the maximum distance between two opposed points (length A) in the perimeter of an aperture 20 is comprised between 0.25 mm and 3 mm, as required to increase the tolerance to peeling.

The open area of material may be determined by the following equation:

Open Area=1−Desired Weight $I$(Thickness×Density)

As an example, taking a desired weight of 100 grams per square meter (gsm) and using 17 micrometer thick copper as the desired material, which has a density of 8.89×106 g/m3, the open area is determined to be:

Open Area=1−100$I$(17×10−6×8.89×106)

A 17 micrometer thick copper material having a weight of 100 g/m2 will be suitable to produce a perforated metallic foil 18 according to the invention.

Once the targeted open area, apertures size and shape are selected, the spacing of the apertures can be determined to achieve the resulting configuration. Carrying on with the example above, for an elliptical shape apertures, calculations are as follows:

Area of ellipse: pi*pore length($A$)/2*pore height($B$)/2

Open area=ellipse area*2/($X$)*($Y$)

Figure 5:
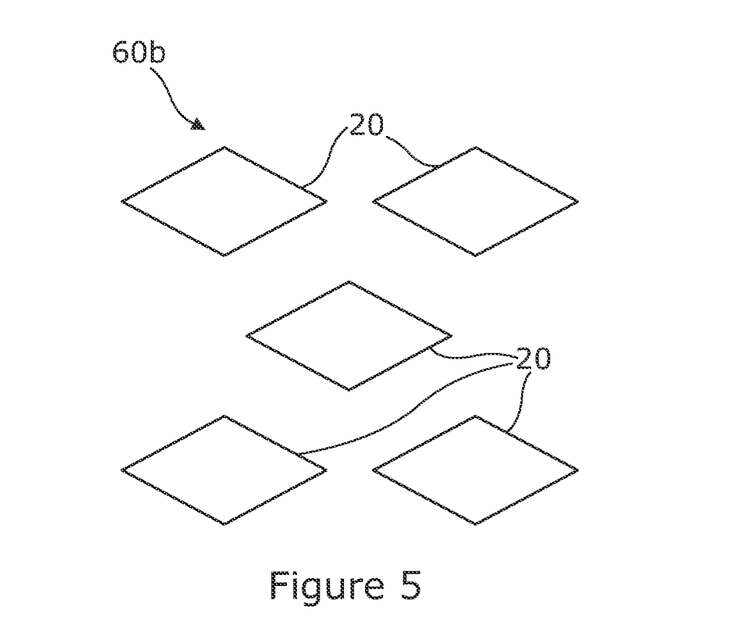
FIG. 5 is a plan view of a portion of a perforated metallic foil having diamond-shaped apertures.
Figure 6:
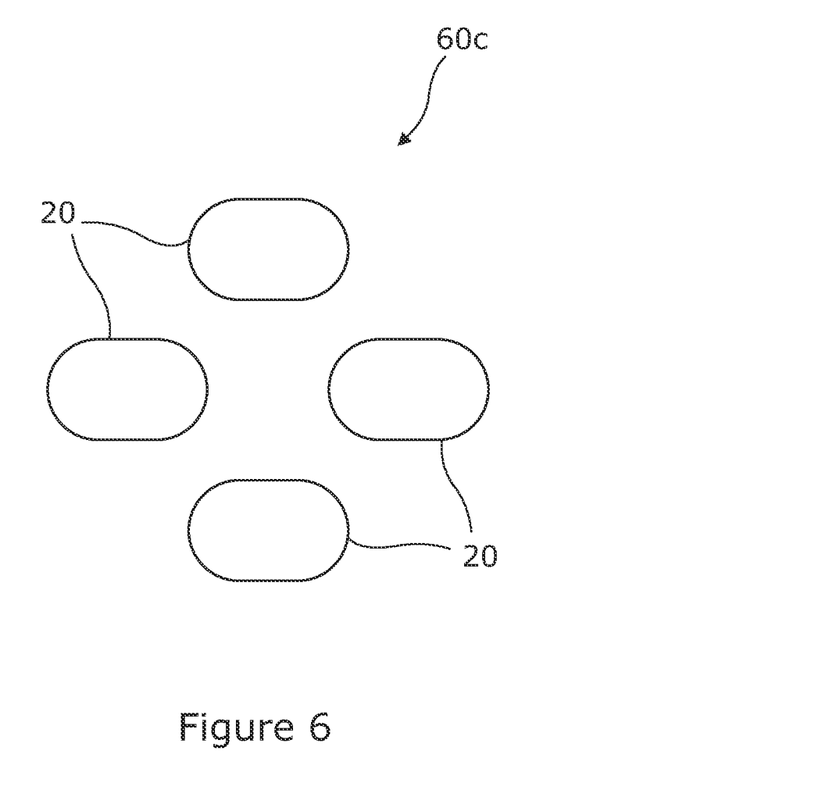
FIG. 6 is a plan view of a portion of a perforated metallic foil having oval-shaped apertures.

Referring to FIG. 5, a portion 60b of a perforated metallic foil 18 is shown to include equally sized, diamond-shaped pores 20 which may be used to form a 17 micrometer thick copper foil suitable for lightning strike applications. Referring to FIG. 6, a portion 60c of a perforated metallic foil 18 is shown to include equally sized, oval-shaped apertures 20 which also may be used to form a 17 micrometer thick copper foil suitable for lightning strike applications.

Using ellipses, ovals or diamond shape apertures, as shown in FIGS. 4 to 6, can be beneficial to obtain a material with fine-tuned anisotropy in term of electrical resistance. The resistivity along the "X" direction versus along the "Y" direction will differ depending upon the spacing and length to height ratio of the apertures 20. It is sometimes desired to utilize a perforated metallic foil 18 with conductive properties that are approximately equal in all directions, i.e., "isotropic". To achieve isotropic features for conductivity, a symmetrical pattern may be used, either in the form of circles or squares.

Figure 7:
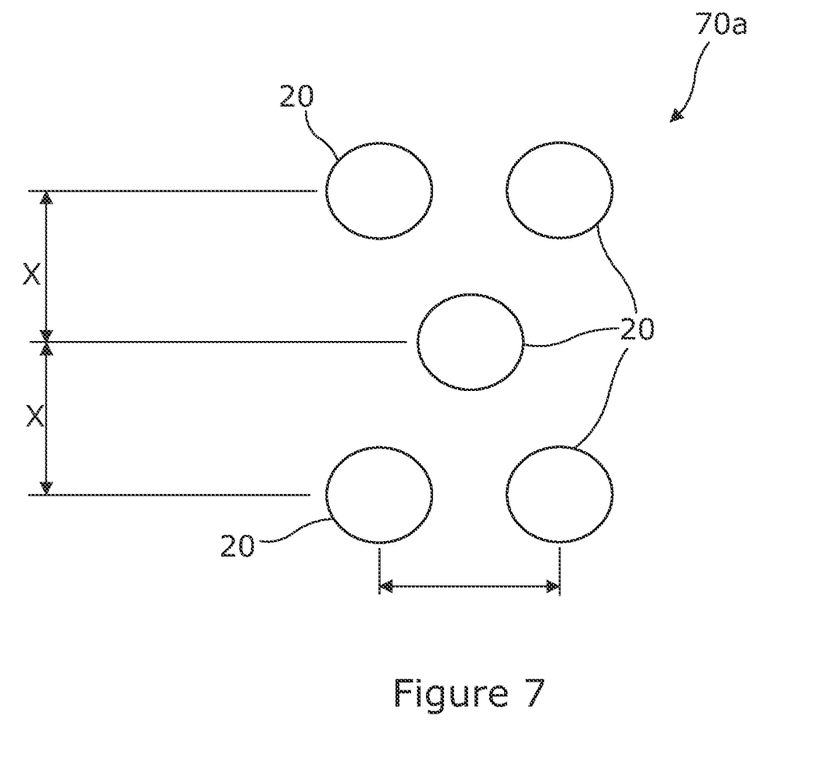
FIG. 7 is a plan view of a portion of a perforated metallic foil having circle-shaped aperture.
Figure 8:
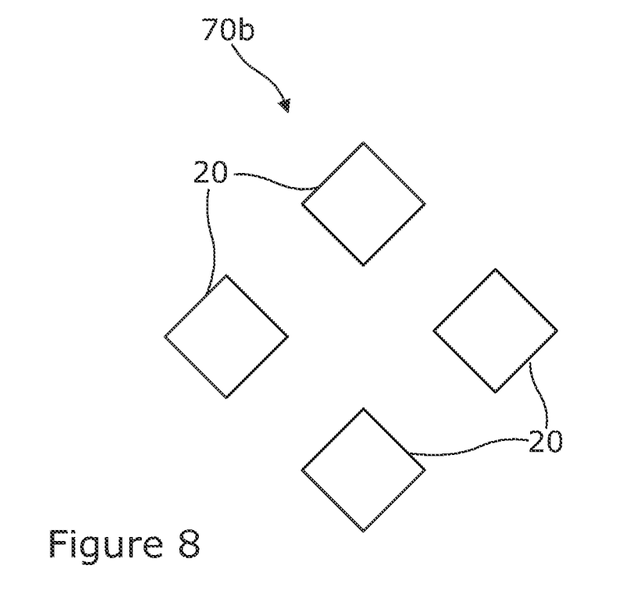
FIG. 8 is a plan view of a portion of a perforated metallic foil having square-shaped apertures.

Referring to FIG. 7, a portion 70a of a perforated metallic foil 18 is shown to include equally sized, and symmetrically spaced circle-shaped apertures 20. Referring to FIG. 8, a portion 70b of a perforated metallic foil 18 is shown to include equally sized, and symmetrically spaced square-shaped apertures 20.

Although not illustrated other shapes for the apertures 20, e.g., polygonal, are possible in order to meet the need for particular electrical resistance of the perforated metallic foil 18.

A method of manufacturing of the perforated metallic foil 18 includes an in-line process of perforating a metallic foil with specifically sized and spaced apertures of various geometric shapes to achieve desired performance characteristics. This could be accomplished using a perforating machine, such as machine 50 depicted in FIG. 9.

Figure 9:
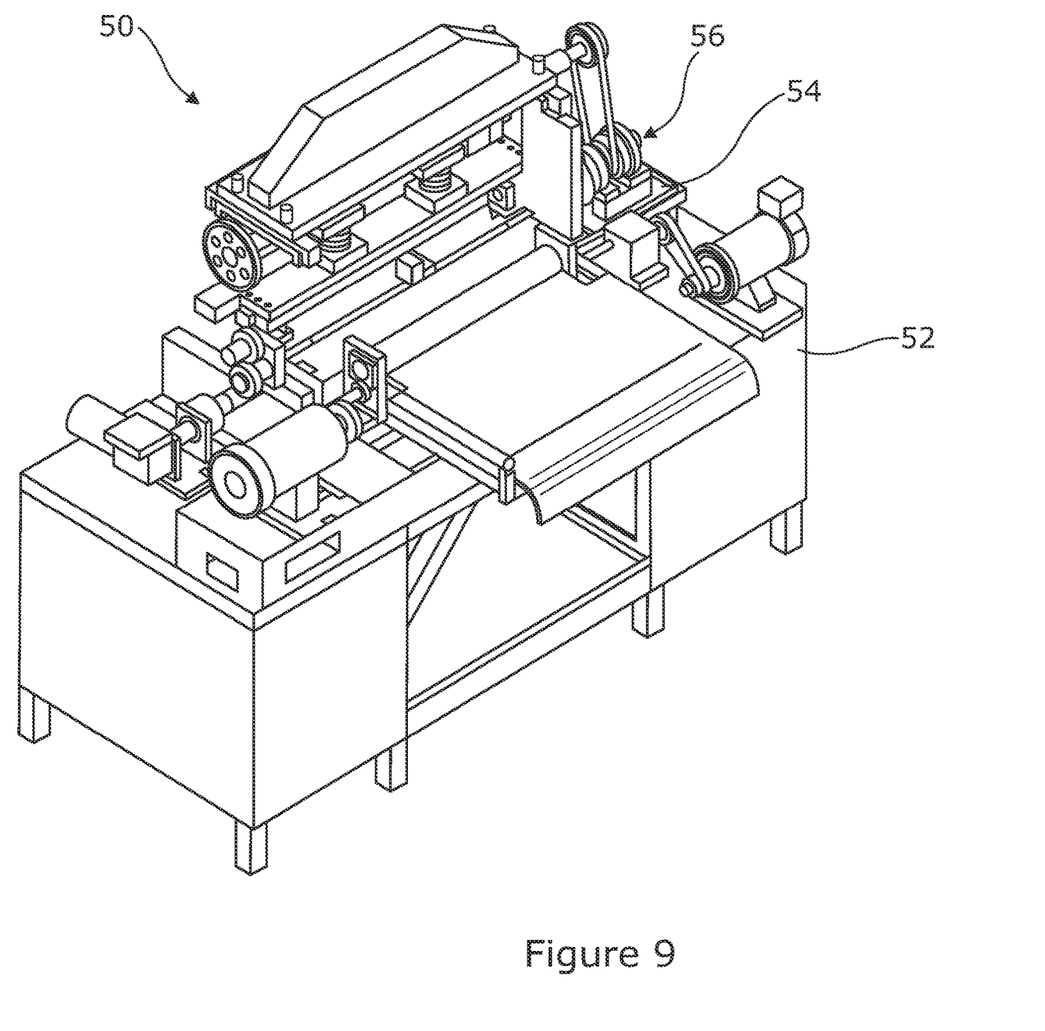
FIG. 9 is a perspective view of a perforating machine for producing a perforated metallic foil.

According to this manufacturing method, a wide web of thin metallic foil 52 with a thickness less than 30 micrometers, with backing material (not visible) is shown being fed under roller 54 and into the cutting dies 56. The backing material also helps to control tension of the metallic foil 52 as it traverses through the cutting dies 56. While not shown in this view, the web of solid foil 52 may be processed in a reel to reel operation. In other words, solid metallic foil 52 with backing material may be fed into machine 50 via a pay-out reel and the web of perforated metallic foil may be received from machine and collected on a take-up reel.

The metallic foil 52 may be pretreated to improve its durability and adhesion characteristics. In addition, the metallic foil 52 may be passivated, which creates an inert surface that is resistant to tarnishing and oxidation. Also, the metallic foil 52 may be coated with silane, which helps to provide the material with improved adhesion characteristics.

By perforating the thin metallic foil 52, a perforated metallic foil 18 is obtained with a plurality of apertures 20 of a predefined geometric shape extending through the thickness of the metallic foil 52 and being distributed across a surface area may be formed. The aggregate amount of open area formed by the apertures 20 is configured to provide maximum conductivity while maintaining as light a weight as possible. Sizing of the apertures 20 is very important in order to maintain desired strength, conductivity, and effective adhesion properties and the following sections describe exemplary methods for designing the open area for perforated metallic foil 18 according to this invention.

An alternate approach (not illustrated) to using a mechanical die-based perforating machine, such as machine 50, would be to use a reel-to-reel galvanometric laser to accomplish the precision cutting/ablating to manufacture the metallic foils according to an aspect of this invention.

The invention has been described above when the composite panel 10 comprises a honeycomb core 12. In another variant of the invention, and in relation with the FIG. 10, the composite panel 110 is monolithic and comprises a plurality of carbon plies 116 arranged on a back side 111a of the panel 110.

A thin perforated metallic foil 118, of identical characteristics to that of the perforated metallic foil 18 described in connection with FIGS. 1 to 8, and comprising several apertures 120, is secured to the plurality of carbon plies 116, directly or indirectly via an optional isolation ply 117 made of electrical insulating material, interposed between the perforated metallic foil 118 and the plurality of carbon plies 116.

Figure 10:
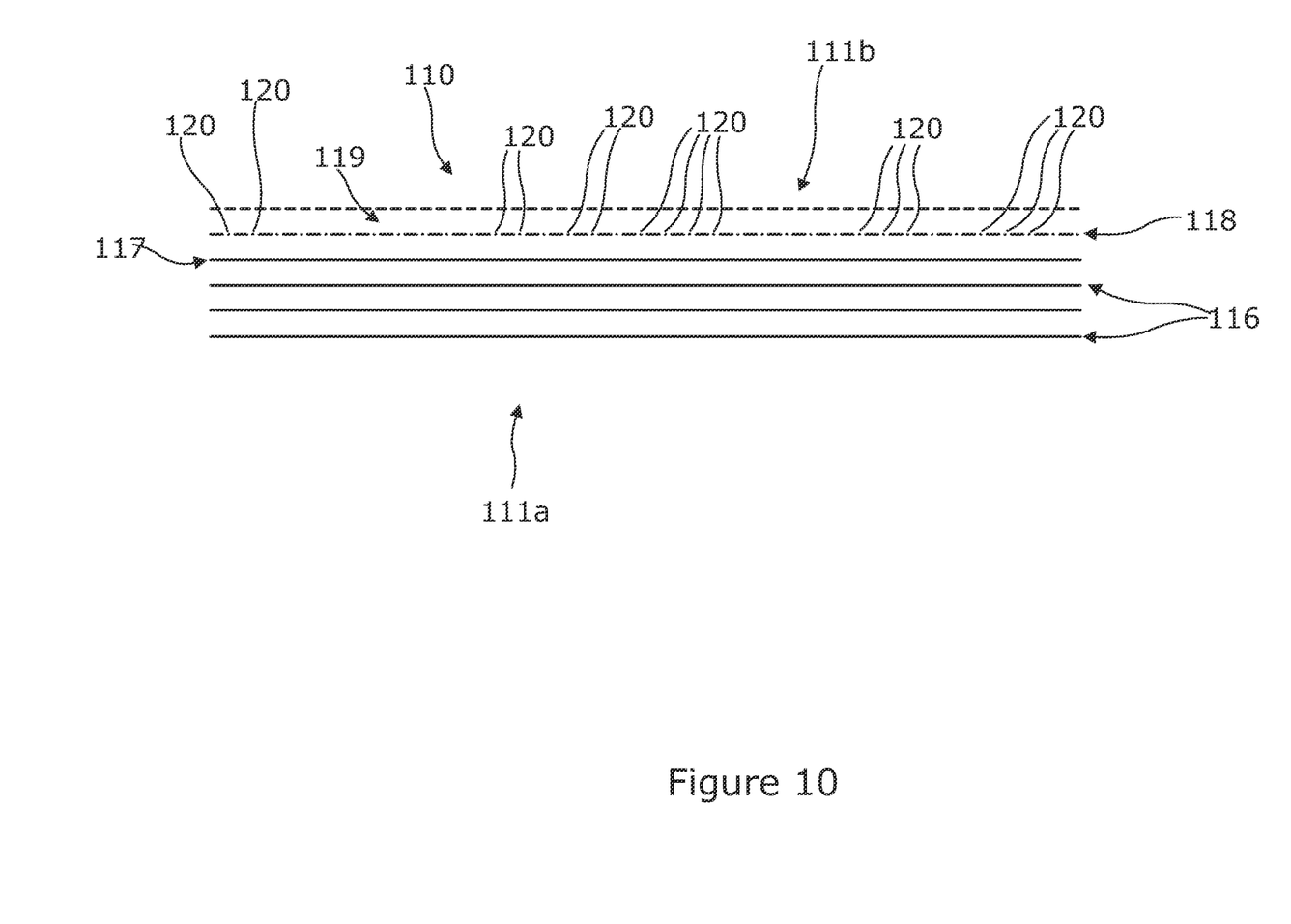
FIG. 10 is a view similar to FIG. 1 showing a composite panel including a perforated metallic foil according to another aspect of this invention.

Finally, a protective layer 119 made from resin (e.g., an epoxy-based resin) is secured to the perforated metallic foil 118, with the perforated metallic foil 118 being embedded in the protective layer 119 through its apertures 120. A free surface of the protective layer 119 forms a top side 111b of the composite panel 110, i.e., the side of the panel 110 that when arranged on the structure of an aircraft, will form the exterior face of the skin of the aircraft and, as such, will be painted with protective and decorative paints.

The aim of the protective layer 119 is to prevent peeling of the perforated metallic foil 118. To this end, the thickness of the protective layer between the top side 111b of the composite panel 110 and the metallic foil 118 is at least 15 micrometers, and preferably around 40 micrometers. In particular, the protective layer 119 can contain a fibrous reinforcement to enhance is mechanical resistance and hence, to even reduce the tendency to peel away due to erosion causes by air flow mixed with dust and water droplets. This reinforcement, woven or non-woven can be in glass fibers or in carbon fibers and its typical areal weight is comprised between 2 to 20 g/m$^2$.

During the manufacturing process of the composite panel 110, the protective layer 119 can be applied separately from the perforated metallic foil 118 (as a resin film) or it can also pre-impregnate the perforated metallic foil 118, or it could also come from resin injected or infused during the manufacturing process of the composite panel 110.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A composite panel for an aerospace structure comprising a plurality of carbon plies, comprising:
   a perforated metallic foil comprising a plurality of apertures directly secured to the plurality of carbon plies, and
   a protective layer made from resin containing fibrous reinforcement whose areal weight is comprised between 2 to 20 g/m$^2$, said protective layer being secured to the perforated metallic foil with the perforated metallic foil being embedded in the protective layer through its apertures,
   a free surface of the protective layer forming a top side of the composite panel,
   a thickness of the protective layer between the top side of the composite panel and the perforated metallic foil being at least 15 micrometers and
   the perforated metallic foil having a thickness of not more than 30 micrometers,
   the plurality of apertures having a predefined geometric shape extending through the thickness of the perforated metallic foil and being distributed across a surface area defined by a length and a width of the perforated metallic foil,
   the plurality of apertures in an aggregate defining an open area of not more than 40% of the surface area and a maximum distance between two opposed points in a perimeter of an aperture being equal or less than 3 mm.

2. The composite panel according to claim 1, wherein the perforated metallic foil is made from copper or a copper alloy and has a weight of not more than 300 g/m$^2$ and a weight to conductivity ratio of not more than 0.40 gram-ohms per square.

3. The composite panel according to claim 1, wherein the perforated metallic foil is made from aluminum or an aluminum alloy and has a weight of not more than 250 g/m$^2$ and a weight to conductivity ratio of not more than 0.19 gram-ohms per square.

4. The composite panel according to claim 1, wherein the predefined geometric shape of the plurality of apertures is circular.

5. The composite panel according to claim 1, wherein the predefined geometric shape of the plurality of apertures is non-circular.

6. The composite panel according to claim 5, wherein the predefined geometric shape of the plurality of apertures is one of elliptical, diamond, oval, and square.

* * * * *